United States Patent
Link et al.

(10) Patent No.: US 8,663,749 B2
(45) Date of Patent: Mar. 4, 2014

(54) METHOD AND DEVICE FOR PRODUCING POLYMER LAMINATIONS OR STRAND-SHAPED APPLICATIONS ON A SUBSTRATE

(75) Inventors: Alfred Link, Pulheim (DE); Stephan Morhenn, Krefeld (DE)

(73) Assignee: Sonderhoff Chemicals GmbH, Cologne (DE)

(*) Notice: Subject to any disclaimer, the term of this patent is extended or adjusted under 35 U.S.C. 154(b) by 0 days.

(21) Appl. No.: 13/522,118

(22) PCT Filed: Jan. 6, 2011

(86) PCT No.: PCT/IB2011/050050
§ 371 (c)(1),
(2), (4) Date: Jul. 13, 2012

(87) PCT Pub. No.: WO2011/086478
PCT Pub. Date: Jul. 21, 2011

(65) Prior Publication Data
US 2012/0295034 A1 Nov. 22, 2012

(30) Foreign Application Priority Data
Jan. 15, 2010 (DE) .......................... 10 2010 000 088

(51) Int. Cl.
| | |
|---|---|
| C08F 2/46 | (2006.01) |
| C08J 7/18 | (2006.01) |
| H05H 1/00 | (2006.01) |
| B05B 5/025 | (2006.01) |
| B05C 5/00 | (2006.01) |
| B05C 9/08 | (2006.01) |

(52) U.S. Cl.
USPC .......................... 427/488; 118/620

(58) Field of Classification Search
USPC ....................................................... 427/488
See application file for complete search history.

(56) References Cited

U.S. PATENT DOCUMENTS

| | | | |
|---|---|---|---|
| 3,832,260 A | | 8/1974 | Straughan et al. |
| 3,962,486 A | * | 6/1976 | Gerek et al. ................... 427/447 |
| 4,082,726 A | * | 4/1978 | Mine et al. ....................... 528/31 |
| 6,359,026 B1 | * | 3/2002 | Marquardt et al. .............. 522/71 |
| 6,419,995 B1 | * | 7/2002 | Kuckertz et al. ............... 427/536 |
| 6,743,483 B2 | | 6/2004 | Rochefort et al. |
| 2005/0042436 A1 | | 2/2005 | Glorioso et al. |
| 2008/0311378 A1 | * | 12/2008 | Simpson ..................... 428/319.1 |
| 2009/0226747 A1 | * | 9/2009 | Arber et al. ..................... 428/480 |
| 2011/0215497 A1 | * | 9/2011 | McEvoy et al. ................. 264/48 |

FOREIGN PATENT DOCUMENTS

| | | |
|---|---|---|
| DE | 33 22 190 A1 | 3/1985 |
| DE | 197 27 129 A1 | 1/1999 |
| DE | 103 31 487 B3 | 11/2004 |
| WO | 2009/106289 A2 | 9/2009 |

OTHER PUBLICATIONS

English translation of the International Preliminary Report on Patentability dated Aug. 7, 2012 in corresponding International Patent Application No. PCT/IB2011/050050, filed Jan. 6, 2011.

* cited by examiner

*Primary Examiner* — Dah-Wei Yuan
*Assistant Examiner* — Kristen A Dagenais
(74) *Attorney, Agent, or Firm* — Rankin, Hill & Clark LLP

(57) ABSTRACT

A process and apparatus for the production of polymer layers or of strand-shaped applications on a substrate, in particular of FIPFG seals, by applying a reactive, foamable polymer material on the substrate, and the polymer material being subjected to a corona treatment or plasma treatment after it has been applied on the substrate.

15 Claims, 1 Drawing Sheet

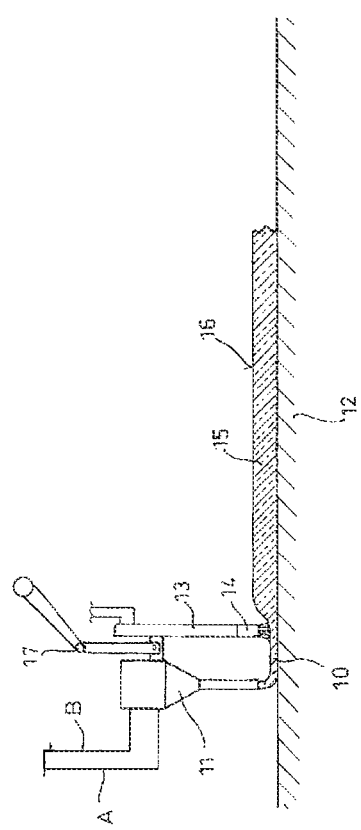

METHOD AND DEVICE FOR PRODUCING POLYMER LAMINATIONS OR STRAND-SHAPED APPLICATIONS ON A SUBSTRATE

The invention relates to a process for the production of polymer layers or of strand-shaped applications on a substrate, in particular of FIPFG seals, by applying a reactive, foaming polymer material on the substrate. The invention also relates to an apparatus for the production of polymer layers or of strand-shaped applications on a substrate, in particular of FIPFG seals, with metering equipment for the polymer material to be applied, where the equipment has an applicator that can be moved relative to the substrate.

BACKGROUND OF THE INVENTION

The processing of reactive polymer materials has been widely used in industry for many years and for many application sectors. Among the materials are by way of example epoxy resins, polyurethanes, and silicones. A difference from the processing of thermoplastic materials is that reactive polymer materials allow the shaping process to be combined with chemical crosslinking. This gives heat-resistant moldings (thermosets), a result not achievable with purely thermoplastic materials.

The reactive polymer materials are often processed in molds or else by casting in situ. Examples here are the production of automobile seats (molded foam process) or the casting of epoxy resins around electronic components.

Within the last 20 years, a technique which is also known as FIPFG (formed in place foam gasket) has become established for the sealing of housing components, lamps, or packaging lids. Certain variants of reactive polymer materials are used here, and are applied directly on the respective component in the region of the seal to be produced. They then cure at their location of use and also exhibit a foaming effect. This typically gives a strand-shaped foam structure, providing a sealing bead produced in situ. Typical materials for this are polyurethanes and silicones, which in most cases are produced in the form of 2-component systems. In these processes, a mixture of the two components is applied with the aid of a suitable discharge nozzle, with control of the amount discharged and with control of discharge velocity, onto the component that requires sealing. In most cases this takes place without shaping, i.e. the trajectory of the seal or the height of the seal is not determined by subsequent application of any counterpart, but instead results from free foaming. Examples of other products produced alongside seals in a similar manner are sheet-like layers on components via application of foaming polymer material with the aid of suitable applicator nozzles which move across the component region that requires lamination—an example of a component being an engine hood—and thus apply the polymer material to the area that requires coating.

In contrast to foaming processes that involve shaping and in which the reaction/hardening of the reactive polymer-material system can be accelerated by appropriate adjustment of temperature, the only way of achieving acceleration of the reaction and hardening in the frequently occurring case described where the reactive polymer material is applied without shaping for the lamination of a component or for the application of a sealing strand is to incur major costs, in that the component is, for example, heated in an oven or is treated with microwaves. 2-component polyurethane (PU) foam systems, single-component PU foam systems, single-component silicone foam systems, and especially 2-component silicone foam systems often exhibit relatively slow completion of reaction after they have been applied on industrial components. This requires that in particular 2-component silicone foam systems are almost always post-treated with the aid of an oven after application in order firstly to render the surface of the resultant sealing foam tack-free and secondly to produce the long-term service properties (resilience) which would not develop fully without heat treatment.

However, post-treatment methods of this type are naturally subject to limitations caused by the size of the component, and when a component is transferred into a thermal oven or microwave oven extreme care is always required to avoid damage to the freshly applied polymer material that is still soft or liquid.

Although the known process, and the apparatuses and materials used therein, can produce seals and layers in reproducible quality without post-treatment in an oven or microwave equipment, a possible consequence of the nature of the polymer material used here is that the time required by the material applied to complete its reaction is relatively long, with the frequently disadvantageous consequence that, after the sealing material or lamination material has been applied, the components first have to be stored for some time before they are passed onwards for appropriate use, for example are capable of installation into an automobile. In the case of some materials, the desired product properties cannot be achieved to the desired extent without thermal post-treatment in an oven as explained. Care has to be taken during storage that the polymer material applied is not subject to impression or to any other type of damage as a consequence of which the seal or layer would not be serviceable or at least would not be free from defects.

SUMMARY OF THE INVENTION

It is an object of the invention to provide a process and an apparatus of the nature mentioned in the introduction, so that components provided with foaming polymer material to form a seal or other laminate can be further used after a relatively short time.

This object and others are achieved, in terms of a process, in that the polymer material is subjected to a corona treatment or plasma treatment after it has been applied on the substrate. The apparatus of the invention is accordingly characterized in that it has at least one plasma generator which can be moved so as to follow the applicator.

Surprisingly, it has been found that by using, on the polymer material after its application, the plasma-treatment or corona-treatment processes otherwise used for the pre-treatment of surfaces prior to coating thereof or the like, it is possible to achieve considerable acceleration of the hardening/completion of reaction of the material, thus rapidly achieving completion of reaction of reactive polymer materials in an efficient and cost-saving manner, after application. A plasma generator or corona-discharge equipment traverses the reactive polymer materials, in particular foaming reactive polymer materials, after they have been applied in the form of lines or in sheet-like form on the component, or have been applied in other shaping processes, and the materials are thus subjected to the plasma treatment or corona treatment and can thus be induced to undergo accelerated and almost complete hardening within a time that is considerably shorter than the hardening time without post-treatment. The process of the invention provides a particular advantage in the processing of, or operations on, heat-sensitive components (substrates) on which only a small amount of the polyurethane material is applied, where this can also, if necessary, be subjected to treatment at precisely defined points or along precisely defined lines by the plasma generator or corona-discharge equipment. The substrate itself then remains in essence unaffected by the treatment and in particular is not subjected to any thermal effects.

As previously indicated, the polyurethane material can be a single- or 2-component polyurethane foam material or else a single- or 2-component silicone foam material. A polymer material that has proven particularly suitable for use in the process of the invention is a 2-component silicone foam material that crosslinks by the addition-crosslinking route preferably at room temperature.

In an advantageous embodiment of the process of the invention, the polymer material is subjected to a treatment with an atmospheric plasma generator after it has been applied, where the plasma nozzle of the plasma generator traverses the applied polymer material preferably at a distance of from 1 to 10 mm, more preferably from 3 to 6 mm, in particular about 4 mm, from the surface of the material. Experiments have moreover shown that a particularly good result is achieved when the relative speed of movement of the plasma nozzle with respect to the applied polymer material is from 0.3 to 25 m/min, preferably from 0.5 to 15 m/min. The ideal velocity and the distance of the plasma nozzle from the polymer material naturally depend on the power rating and the nature/configuration of the plasma generator used. In all cases it is particularly advantageous if the relative velocity of the plasma generator with respect to the polymer material previously applied by means of an applicator nozzle or the like on the substrate has been adjusted appropriately to the relative velocity of applicator nozzle with respect to substrate, i.e. that the relative velocity of movement of the plasma generator with respect to the substrate or the polymer material applied thereon is the same as that relating beforehand to the applicator nozzle used to apply the polymer material on the substrate. This gives an identical cycle time for the two steps of the process, and this is particularly desirable for automation of the process.

In an embodiment of the apparatus particularly suitable for carrying out the process of the invention, the arrangement of the plasma generator relative to the applicator can be such that the location of its plasma nozzle is above the polymer material previously applied on the substrate by the applicator. Plasma generator and applicator can have been mounted on a shared holder in such a way that the plasma generator follows exactly the same path as the applicator at a short distance therefrom, for example just a few centimeters, and thus post-treats, immediately after it has been applied, the polymer-material strand then located under the plasma nozzle in the region of action thereof. It is naturally also possible—particularly when the shapes of the seals to be produced are complicated—that the plasma generator is moveable on operating equipment separate from the applicator, in particular on a robot, above the strand of material, across the component.

In order to permit ideal appropriate adjustment of the apparatus to the changing conditions which are determined especially via different materials that can be treated with the apparatus, it is advantageous if the distance of the plasma nozzle from the applicator and/or from the substrate or from the polymer material applied thereon is adjustable.

These and other objects, aspects, features, developments and advantages of the invention of this application will become apparent to those skilled in the art upon a reading of the Detailed Description of Embodiments set forth below taken together with the drawings which will be described in the next section.

BRIEF DESCRIPTION OF THE DRAWING

The FIGURE is a simplified diagram of a side view showing the effect of a plasma treatment of the invention on a sealing strand previously applied on a component.

DETAILED DESCRIPTION OF EMBODIMENTS

Referring now to the drawing wherein the showings are for the purpose of illustrating preferred and alternative embodiments of the invention only and not for the purpose of limiting same, the preferred embodiment uses a commercially available, two-component silicone foam system 10, as is known for the production of foam seals for housings, packaging lids, etc. An example of silicone foam systems of this type is the product FERMASIL from the applicant, the components of which, FERMASIL A-47-14 and FERMASIL B-47-14, are generally processed in a mixing ratio of 1:1. This material involves a silicone foam system which uses the addition-crosslinking route. In the invention, components A and B of the material are mixed in the desired mixing ratio of 1:1 with the aid of a commercially available mixing and metering system, e.g. a DM 403 from Sonderhoff Engineering GmbH, in a mixing head 11 and are applied to any desired substrate 1.

An atmospheric plasma generator 13 transverses the material 10 immediately after it has been applied. The plasma generator can by way of example involve equipment from Plasmatreat (previously: Agrodyn), e.g. the FG1001 or BJ 2001 model, or the FG 5002 S model, provided with a rotatable (plasma) nozzle 14. When the plasma generator 12 moves at a velocity of V=from 0.5 to 1 m/min and the distance of the plasma nozzle 14 from the surface of the material is about 4 mm, the 2-component silicone seal material expands immediately to the final height of the resultant seal 15, and the surface 16 of the seal 15 is already tack-free about 5 sec. after the plasma treatment.

After this treatment, the material moreover proves to have markedly improved resilience after a conventional test for what is known as compression set in accordance with DIN 53572 and DIN 53517. The plasma treatment moreover has a favorable effect on the hardness of the seal material, which is namely softer, i.e. more yielding, in comparison with a material which is identical but has not been subjected to any plasma treatment: Shore 00 hardness decreased by an average of 10%. The plasma post-treatment moreover gives the silicone seal foam a better width-height ratio. In comparison with the material that has not been post-treated, the width-height ratio decreases from 2/1 to from 1.5 to 1.8/1.

The velocity at which the plasma assembly moves is variable, and is adjusted appropriately, being dependent on the intensity of the plasma generated by means of the nozzle. In the preferred embodiment in the diagram, the mixing head 11 and the plasma generator 13 have been attached to a shared robot arm 17, which always guides the two assemblies in such a way that the plasma nozzle 14 and the preceding mixing head traverse the same course on the substrate, so that the plasma nozzle subjects the previously applied strand of material to the desired plasma treatment.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the forego-

What is claimed is:

1. A process for the production of polymer layers or of strand-shaped applications or a formed in place foam gasket on a substrate, the process including the steps of applying a reactive, foamable polymer material on a substrate, subjecting the polymer material to at least one of a corona treatment and a plasma treatment after the polymer material has been applied on the substrate and before the polymer material has cured.

2. The process as claimed in claim 1, wherein the polymer material is a polyurethane foam material.

3. The process as claimed in claim 2, wherein the polymer material is a two-component polyurethane foam material.

4. The process as claimed in claim 1, wherein the polymer material is a silicone foam material.

5. The process as claimed in claim 4, wherein the polymer material is two-component silicone foam material.

6. The process as claimed in claim 4, wherein the polymer material comprises a two-component silicone foam material which crosslinks by an addition-crosslinking route.

7. The process as claimed in claim 1, wherein the polymer material is subjected to a treatment with an atmospheric plasma generator after it has been applied.

8. The process as claimed in claim 7, wherein a plasma nozzle of the plasma generator traverses the applied polymer material at a distance of from 1 to 10 mm from the surface of the applied polymer material.

9. The process as claimed in claim 7, wherein a plasma nozzle of the plasma generator traverses the applied polymer material at a distance of from 3 to 6 mm from the surface of the applied polymer material.

10. The process as claimed in claim 7, wherein a plasma nozzle of the plasma generator traverses the applied polymer material at a distance of about 4 mm from the surface of the applied polymer material.

11. The process as claimed in claim 7, wherein the relative speed of movement of a plasma nozzle of the plasma generator with respect to the applied polymer material is from 0.3 to 25 m/min.

12. The process as claimed in claim 7, wherein the relative speed of movement of a plasma nozzle of the plasma generator with respect to the applied polymer material is from 3 to 15 m/min.

13. The process as claimed in claim 8, wherein the relative speed of movement of a plasma nozzle of the plasma generator with respect to the applied polymer material is from 0.3 to 25 m/min.

14. The process as claimed in claim 4, wherein the polymer material comprises a two-component silicone foam material which crosslinks by the addition-crosslinking route at room temperature.

15. The process as claimed in claim 1, wherein the subjecting the polymer material to at least one of a corona treatment and a plasma treatment is performed before the polymer material has cooled.

* * * * *